March 30, 1937.  A. J. SYNCK  2,075,555
RAKE TEETH FOR RAKING CYLINDERS
Filed Nov. 7, 1934
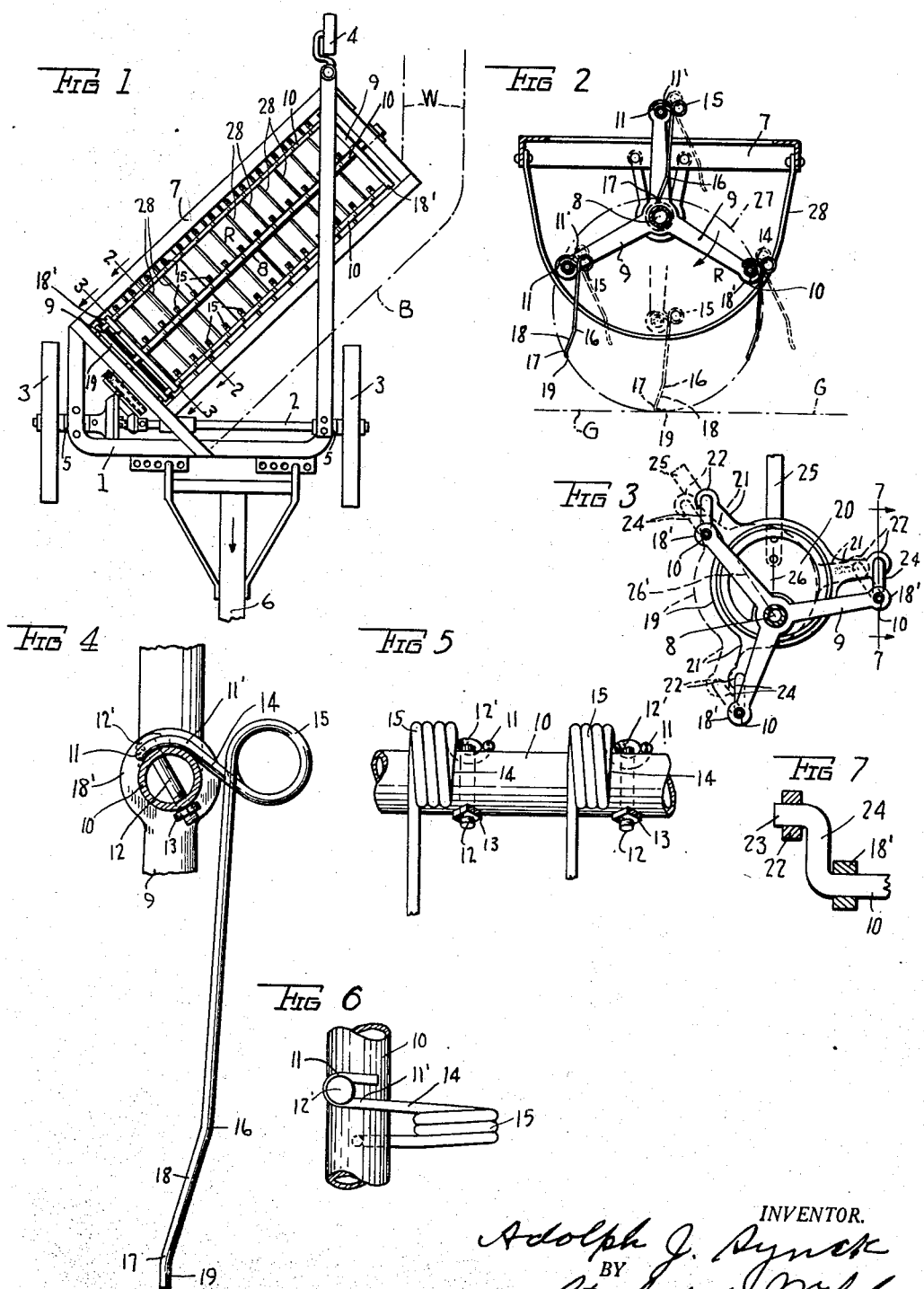
INVENTOR.
Adolph J. Synck
BY
Staley & Welch
ATTORNEYS.

Patented Mar. 30, 1937

2,075,555

UNITED STATES PATENT OFFICE 2,075,555

RAKE TEETH FOR RAKING CYLINDERS

Adolph J. Synck, Coldwater, Ohio, assignor to The New Idea Spreader Company, Coldwater, Ohio, a corporation of Ohio Application November 7, 1934, Serial No. 751,877

5 Claims. (Cl. 56—400)

This invention relates to improvements in spring teeth for raking cylinders for such machines as hay loaders and hay rakes, particularly hay rakes of the side delivery type, the invention being particularly applicable to the last mentioned type of machine, although capable of being used advantageously in other forms of hay rakes and in hay loaders.

In the type of side delivery hay rake, a rotatable raking cylinder or reel is employed which is angularly disposed to the direction of travel of the machine whereby the partly cured hay in the swath is gathered and delivered in the form of a windrow at the trailing end of the raking cylinder. Usually the machine may also be used as a tedder by reversing the direction of rotation of the raking cylinder.

One object of the invention is to provide raking teeth so constructed that they may be attached to the raking bars in a way to permit the removal of any tooth without the necessity of removing any of the other teeth.

Another object of the invention is to so construct the raking teeth whereby the coils therein are so disposed as to afford the least opportunity of entanglement of the hay therewith.

Another object is to have the free end near the extremity so formed as to have a lifting effect on the hay when raking, but to have the extreme point straight so as to get a proper hold on the hay in the swath where the cylinder is run in the opposite direction as is necessary when the machine is used for tedding hay.

In the accompanying drawing:

Fig. 1 is a top plan view of a side rake, the view being shown only conventionally.

Fig. 2 is an enlarged sectional view taken on the line 2—2 of Fig. 1, the line 2—2 being transversely disposed to the axis of rotation of the raking cylinder.

Fig. 3 is an enlarged transverse sectional view taken on the line 3—3 of Fig. 1, and is in a plane parallel to and on the same scale as Fig. 2.

Fig. 4 is an enlargement of a portion of Fig. 2, and is a side elevation of one of the improved raking teeth.

Fig. 5 is a partial front elevation of a pair of the teeth in their assembled side-by-side arrangement.

Fig. 6 is a top plan view of one of the improved teeth.

Fig. 7 is an enlarged fragmentary longitudinal section on the line 7—7 of Fig. 3.

The invention has been shown in the drawing as applied to a hay rake of the side delivery type, although as before stated it is applicable to other types of rakes, to the raking cylinders of hay loaders, or to any machine employing raking teeth.

Referring to the drawing, a hay rake of the side delivery type is shown conventionally in Fig. 1. A main frame is indicated at 1, the forward portion of which is carried by an axle 2 and drive wheels 3, the rearward portion being supported by a castor type wheel 4. The axle 2 is a live axle, and bearings 5 secured to the main frame, are provided to receive the axle. Forward direction of travel of the machine is indicated by the arrow on the member 6 which is in the nature of a tongue.

A portion 7 of the frame is angularly disposed with relation to the direction of travel of the machine under which portion the raking cylinder R is revolubly supported in bearings (not shown) whereby the axis of rotation of the raking cylinder as represented by the cylinder shaft 8 is also suitably angularly disposed so that as the machine advances and the cylinder is rotated in the direction of the full line arrow in Fig. 2, the hay in the swath is preliminarily gathered into a relatively long rolling bunch B (Fig. 1) in advance of the reel and then moved along the cylinder to the delivery end thereof to be deposited in the windrow as denoted by the parallel, dot-dash lines W (Fig. 1).

As is customary, the machine is provided with cylinder elevating and lowering means which are not shown in the present instance, whereby the cylinder may be lifted clear of the ground surface G (Fig. 2) for transport to and from the field, or lowered to and maintained in a nice contact with the ground surface.

In the type of machine shown, it is the practice to secure the teeth to a rake bar capable of having imparted thereto a rockable, or perhaps a rotatable movement, with respect to the cylinder, and in the machines having such cylinder construction, there is employed a mechanism whereby the disposition of the rake bars, and of course therewith the teeth, with respect to the cylinder is altered during a revolution thereof. The change is from a normally radial disposition at the ground contacting portion of the revolution to a tangential disposition, which occurs after about one-quarter of a revolution has been made.

The reel consists of the cylinder shaft 8 previously mentioned, cylinder spiders 9 forming the ends of the cylinder proper and the rake bars 10 to which the teeth are secured. The formation of the improved tooth is best shown in Figs. 4, 5 and 6, in which it will be seen that the tooth has a U-bend portion 11 formed at one end, shown in Fig. 6 in plan whereby the tooth is secured to the rake bar, there being passed through the U-bend 11 a bolt 12 whose head 12' bears against the U-bend while the shank portion of the bolt passes through a transverse opening in the rake bar. A nut 13 on the bolt is provided whereby the tooth is tightly clamped in proper position on the rake bar. Adjacent the U-bend portion the tooth is curved to the curvature of the rake bar 10 as shown at 11' and from the curved portion the tooth is continued by a straight portion 14 which extends in a general lateral direction from the rake bar and is then formed into a coil 15 preferably having a plurality of turns. From the coil 15 the tooth extends downwardly to the ground line when in raking position and is formed with two bends 16 and 17 to provide an inclined portion 18 between the two bends and a straight downwardly-extending portion 19 at the extreme tip of the tooth. This arrangement provides in effect a curved tooth for raking purposes formed by the inclined portion 18 and straight tip 19 and also provides in effect a straight tooth produced by the portion 19 for tedding purposes. In this connection it should be explained that it is desirable for raking that the end or near end of the tooth coming in contact with the hay be curved, as this makes a fluffier windrow than a mere straight tooth, and it is also desirable that for tedding the tooth be straight or provided with a straight portion at its lower end. This form of tooth, therefore, is a combination tooth which is equally adapted for raking and tedding.

The disposition of each coil with respect to its rake-bar 10 is explained by pointing out that as shown in Fig. 4, the longitudinal axis of the tooth securing bolt 12 is near vertical, and that the coil 15 is disposed upwardly and to the right. Thus a coil location is produced that will not readily come in connection with the hay that is to be raked.

In assembling a cylinder after the spiders have been placed on the cylinder shaft 8, a rake bar 10 is rotatably inserted in the aligned, apertured bosses 18' at the ends of corresponding arms of each spider 9, whereby when three arm spiders are employed as shown, there will be three rake bars used, each rake bar being equally spaced from each other and in parallel longitudinal relation with the axis of the reel shaft 8. The teeth are then secured to the rake bars, there being a plurality of aligned openings provided at suitable intervals in each rake bar to receive the bolts 12.

During the portion of the revolution of the cylinder when a rake bar and teeth are leaving the ground a more efficient operation is obtained by providing that the relation of the teeth with relation to the reel will change from the radial to the tangential relation mentioned whereby in a still later portion of the revolution, the teeth are withdrawn from the mass of hay by substantially an upward pull, thereby preventing the catching and carrying over of hay as may happen if the teeth were maintained in the radial relation throughout the revolution.

This change in the relation of the teeth is shown in Fig. 2. At the lower portion of this view there is shown in dot-dash outline a raking tooth and a portion of a cylinder spider arm as they appear at the lowermost part of the revolution and it will be seen that the tooth body is substantially radially disposed with respect to the cylinder and is also substantially at right angles to the ground surface. The left hand portion of the view shows the tooth after a part of a revolution has been made in the direction of the arrow on the spider arm. The tooth is now no longer in a radial relation but rather in the tangential disposition mentioned, and it can be seen that during this part of the revolution the tooth is really lifted from the hay in a vertical direction.

The mechanism by which the tooth relation is changed consists of a freely rotatable eccentric strap 19 mounted on an eccentric 20 carried in any of several possible adjusted positions on the cylinder shaft 8. The eccentric strap 19 is provided with outwardly extending radially disposed arms 21 of the same number as the rake bars, and at the end of each arm there is provided an apertured boss 22 into which the crank pin 23 of a crank arm 24 integrally attached to the adjacent end of a rake bar 10 is rotatably received (Fig. 7). The eccentric 20 is stationarily held by means not shown other than the fragment of the lever arm 25 secured to the eccentric, and as the cylinder revolves the eccentric strap is moved about the eccentric with the result that the relation of the crank arms relative to the major axis of the eccentric denoted by the full line 26 (Fig. 3) is maintained throughout a revolution so long as the position of the eccentric is not changed.

Preferably the longitudinal extension of the crank arm 24 is disposed in a plane parallel to the tooth body portion, whereby when the major axis 26 of the eccentric is adjusted to a vertical position each of the crank arms 24 and therewith the tooth body portions of the teeth will also be in a substantially vertical position, and this relation will be maintained throughout a revolution, as can be seen from the position of the teeth in Fig. 2, the broken circle 27 indicating the circular path taken by the ends 19 of the teeth.

The formation of the improved raking teeth is especially adapted to partly lift the hay mass it is raking, thus making fluffier windrows and thus facilitating the drying of the partly dry hay as most hay is windrowed when in a semi-dry state, and left to do the final drying in the loose fluffy windrow. The straight extreme end portion of the teeth is most effective when the cylinder is run in the opposite direction for tedding to get a good hold on the hay on the ground to loosen it up from the swath, as when after a rain, it is beaten down or at any time when a tedding action is desired.

By the adjustment of the eccentric, as shown by broken lines in Fig. 3, the relation of all the rake bars may be simultaneously altered whereby the teeth are pointed forwardly or rearwardly, as desired in the direction of the cylinder rotation, but even then the coils remain above the level of the rake bars. A pointing of the teeth to the rear is shown by the dash lines in Fig. 2 and is produced by setting the eccentric 20 (Fig. 3) by means of the lever arm 25 as shown by the broken line position where the major axis of the eccentric shifts to the broken line 26'.

The cylinder is driven by means shown conventionally but not described, which means include provision for rotating the cylinder in either direction of rotation. As a side delivery rake the cylinder revolves in the direction of the arrow in Fig. 2. The same machine may be used as a tedder, in which event the cylinder would be rotated in the opposite direction. In tedding, better results might be obtained by pointing the teeth to the rear as shown by the broken lines mentioned and produced by the shifting of the eccentric. Also in raking, the condition of the hay may indicate that good results are obtainable only when the teeth are pointed forwardly or to the opposite direction as shown by the broken lines in Fig. 2, so as to get under the hay, which pointing is produced by an opposite shift of the eccentric from the broken line position thereof in Fig. 3. In either shifting the coils remain above the level of the rake bars. The curved bars 28 represent the well known stripper bars which further prevent entanglement of hay with the reel or the coils of the teeth.

Having thus described my invention, I claim:

1. In a machine of the character described, a rake bar, rake teeth attached to said bar, said teeth being extended laterally of said bars and rearwardly of the same with reference to the direction of travel when raking, and thence in a downwardly direction, said teeth being formed each with a coil at the junction of the laterally extending and downward portion thereof, said downward portion consisting of at least three straight sections integrally attached to one another, the angle between any two adjacent sections being an obtuse angle.

2. In a machine of the character described, a rake bar, rake teeth attached to and projecting downwardly from said rake bars, each tooth having a U-bend portion and a straight portion integrally attached thereto extending downwardly and rearwardly with respect to direction of travel of machine when raking and ending in a coil, and a downwardly extending portion integrally attached to said coil, said downwardly extending portion consisting of at least three straight sections with obtuse angles between any two adjacent sections, the outermost tip section being bent so as to be substantially in alignment with the section adjacent the coil.

3. In a machine of the character described, a bar, a tooth secured to said bar, said tooth being provided with an inner portion extending from said bar, an intermediate portion bent from said inner portion and inclined in the direction of rotation of said tooth when raking, and an outer tip portion bent from said intermediate portion and extending rearwardly with relation to said intermediate portion considering the direction of rotation of said tooth when raking to adapt the tooth for tedding purposes when the tooth is rotated in the opposite direction than that when raking.

4. In a side delivery rake, a rotatable rake cylinder, fenders partially encircling said cylinder, said cylinder having rake bars, rake teeth attached to and projecting from said rake bars, each tooth having an inner portion attached to and extending from its corresponding rake bar, said tooth being bent to form an intermediate portion extending forwardly in the direction of rotation of said cylinder when performing a raking operation, the lower end of said intermediate portion being formed with a bend reverse to the first-mentioned bend to provide a tip adapted for tedding purposes when the cylinder is rotated in the opposite direction.

5. In a side delivery rake, a rotating rake cylinder, fenders partially encircling said cylinder rake bars on said cylinder non-rotatable on their own axes, rake teeth attached to and projecting from said rake bars, the outer portion of each of said teeth being bent forwardly with reference to the inner portion so as to give a fluffing action to the hay as it is being raked and windrowed, and an outermost tip portion bent backwardly with reference to the inclined outer portion considering the direction of rotation of the cylinder when raking to prevent hooking into the ground as the teeth rake over the ground.

ADOLPH J. SYNCK.